United States Patent [19]
Jackson

[11] 3,799,066
[45] Mar. 26, 1974

[54] RESILIENT RAILWAY TRUCK SUSPENSION

[75] Inventor: Keith L. Jackson, Granite City, Ill.

[73] Assignee: General Steel Industries, Inc., St. Louis, Mo.

[22] Filed: Dec. 26, 1972

[21] Appl. No.: 318,239

[52] U.S. Cl. ......... 105/182 R, 105/136, 105/197 B, 105/199 F, 105/200
[51] Int. Cl. .......... B61f 3/04, B61f 5/08, B61f 5/16
[58] Field of Search ............ 105/136, 182 R, 197 B, 105/199 F, 199 R, 200

[56] References Cited
UNITED STATES PATENTS

| R21,987 | 12/1941 | Green | 105/200 |
|---|---|---|---|
| 389,374 | 9/1888 | Feraud | 267/3 |
| 2,925,790 | 2/1960 | Lich | 105/199 R X |
| 3,286,656 | 11/1966 | Lich | 105/199 R |
| 3,315,555 | 4/1967 | Travilla | 105/200 |
| 3,538,856 | 11/1970 | Lich | 105/199 R X |
| 3,650,220 | 3/1972 | Lich | 105/199 F |
| 3,693,553 | 9/1972 | Lich | 105/136 |

Primary Examiner—Robert G. Sheridan
Assistant Examiner—Howard Beltran
Attorney, Agent, or Firm—F. Travers Burgess

[57] ABSTRACT

A resilient railway truck and vehicle suspension provides soft body springing while reducing axle to axle load transference. The axle-supported truck frame swivelly mounts a transverse sub-bolster and a transverse bolster is carried on the sub-bolster by elastomeric pad devices oppositely inclined longitudinally of the truck so that their normals intersect at a level below the axles, preferably about rail level. The bolster supports the body by upright springs at each side of the truck and is restrained against longitudinal movement or tilting movement about its transverse axis with respect to the body so that tipping movements of the truck relative to the body including those necessary to accommodate to changes in vertical track curvature occur about the intersection of the elastomeric pad device normals, thereby reducing or eliminating any vertical moment arm through which the tractive forces might act on the truck to cause objectionable axle to axle load transference.

17 Claims, 4 Drawing Figures

PATENTED MAR 26 1974　　　　3,799,066

RESILIENT RAILWAY TRUCK SUSPENSION

BACKGROUND OF THE INVENTION

Field of the Invention

The invention relates to railway rolling stock and consists particularly in a vehicle suspension in which tractive forces are transferred from a truck to body structure effectively at rail level and the body is resiliently supported on the truck.

The Prior Art

The prior art discloses a locomotive structure in which tractive forces are effectively transmitted from the truck to the body at rail level by the use of body supporting elastomeric pad devices mounted on the truck frame so that their compression axes intersect at rail level, as exemplified by U.S. Pat. No. 3,693,553 to Richard L. Lich. In structures of this type additional springing is not provided between the truck and supported body, so that the vertical springing is limited to that provided by the relatively stiff suspension of the truck frame on the axles and of the truck bolster on the elastomeric pads.

SUMMARY OF THE INVENTION

The invention combines a soft railway vehicle body suspension with means for reducing axle to axle load transference. This combination of features is achieved by supporting a bolster on a swivelly supported sub-bolster by means whereby tractive forces are transferred to the bolster effectively at rail level, supporting the body on the bolster by upright springs, and holding the bolster against tilting movement about an axis transverse of the truck and longitudinal movement, both with respect to the body. Objects of the invention include improved riding qualities resulting from soft springing, reduction in wheel slippage and axle to axle load transference, improved adhesion resulting from effective location of tractive effort transmission point at or near rail level, and ability of the truck to tip about a transverse axis relative to the body to accommodate to variations in vertical track curvature, without causing any significant axle to axle load transference and consequent loss of adhesion.

DETAILED DESCRIPTION

Figure 1:
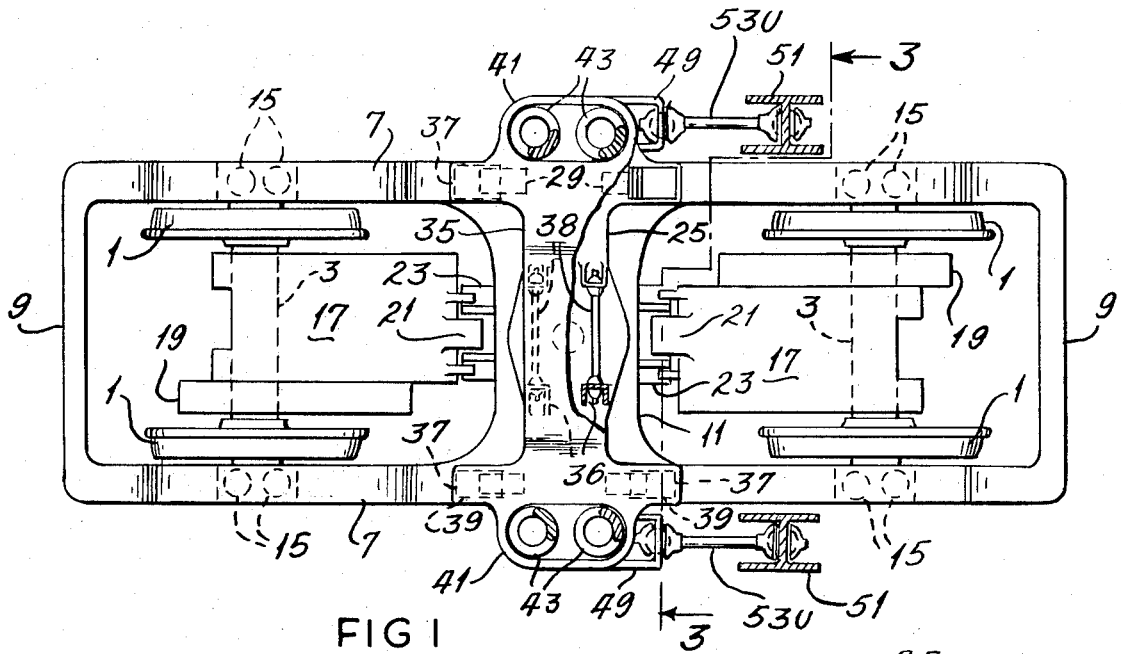
FIG. 1 is a horizontal sectional view along line 1—1 of FIGS. 2 and 3 of a railway vehicle suspension embodying the invention.
Figure 2:
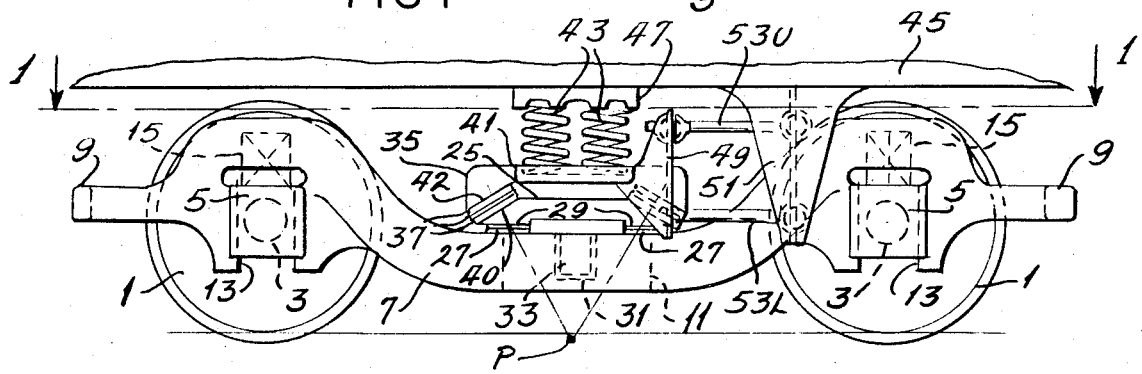
FIG. 2 is a side elevational view of the construction illustrated in FIG. 1.
Figure 3:
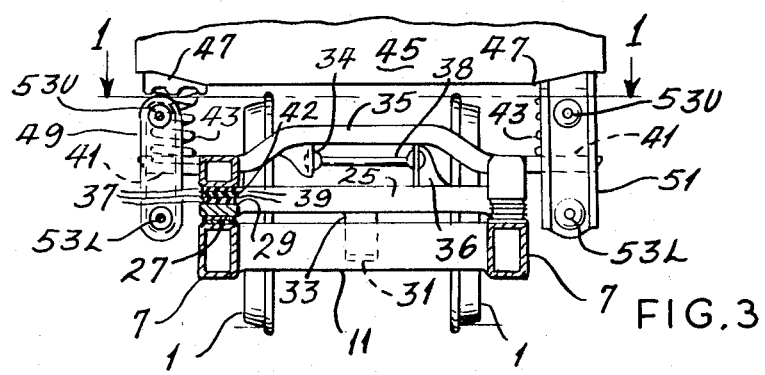
FIG. 3 is a transverse vertical sectional view along line 3—3 of FIG. 1.

The numeral 1 denotes railway flanged wheels mounted in gauged pairs on spaced railway axles 3 the ends of which outwardly of wheels 1 are rotatably received in journal boxes 5.

A rigid truck frame comprising transversely spaced, longitudinally extending side members 7 connected at their ends by transverse transoms 9, and intermediate their ends by a single transverse transom 11 is formed with downwardly open pedestal jaws 13 in the end portions of side members 7, and journal boxes 5 are vertically slidably received in jaws 13. Upright coil springs 15 seated on journal boxes 5 resiliently support the truck frame on the journal boxes and axles.

For propelling the truck, traction motors 17 are supported on the respective axles 3 and are drivingly connected thereto by gear boxes 19. Motors 17 are provided with reaction connections to the frame by cooperating motor noses 21 and motor nose brackets 23 on the opposing transverse surfaces of intermediate transom 11.

A transverse sub-bolster 25 overlies intermediate transom 11 and is supported on the central portion of the truck frame by downwardly facing bearing surfaces 27 which slidably rest on opposed upwardly facing bearing surfaces 29 on frame side member 7. Pairs of opposed bearings 27, 29 are spaced apart longtudinally of the truck so as to oppose any tendencies of sub-bolster 25 to tip about its axis transversely of the truck.

To provide for swivel of sub-bolster 25 about the center of truck frame 7, 9, 11, transom 11 is formed with an upwardly open cylindrical recess 31 at its center, and sub-bolster 25 is formed with a depending cylindrical boss 33 which is rotatably received in recess 31.

A body-supporting bolster 35 overlies sub-bolster 25 and is supported thereon above each frame side member 7 by pair of longitudinally oppositely inclined elastomeric pad devices comprising flat elastomeric pads 37 interleaved and bounded by flat metal plates 39, seated on and secured to similarly inclined upwardly facing surfaces 40 of sub-bolster 25 and underlying secured to similarly inclined downwardly facing surfaces 42 of bolster 35. Pad devices 37, 39 at each side of the truck and the corresponding sub-bolster and bolster surfaces are inclined upwardly toward each other longitudinally of the truck so that the normals of the pad devices intersect at point P at a substantially lower level, preferably at rail level.

To accommodate tipping movements of bolster 35 relative to sub-bolster 25 permitted through shear of pad devices 37, 39 longitudinally of the truck, while preventing relative swiveling movements of bolster 35 and sub-bolster 25, the central portion of the former is arched between the frame side members and is formed with a pair of depending anchor brackets 34 located near one side of the truck and spaced apart longitudinally of the truck, and sub-bolster 25 is formed with a pair of similarly spaced upstanding anchor brackets 36 adjacent the other side of the truck. A pair of transversely extending parallel anchor links 38 are pivotally connected at their opposite ends respectively to brackets 34 and 36.

With this arrangement, tractive forces received by the wheel at rail level are effectively transmitted at the same level to bolster 35, thus eliminating any vertical moment arm through which they would otherwise act to tip the truck frame about a transverse axis and thereby reduce the load on one axle and increase it on the other.

Bolster 35 extends transversely outboard from frame side members 7 and is there formed with spring seats 41 and a pair of upright coil springs 43 are seated in each spring seat 41. Springs 43 support a body structure 45 through spring caps 47.

In order to maintain the effective level of traction force transmission from the truck to the body at the point of convergence of the pad device compression axes, i.e., at rail level, means are provided for preventing tilting of the bolster about its axis transversely of the truck relative to the body structure and for transmitting draft and retardation forces from the truck to the body structure. The last-named means comprises upright brackets 49 on corresponding ends of spring seat portion 41 of bolster 35, brackets 51 depending from both sides of body structure 45 in longitudinally spaced relation from bolster brackets 49, and at each side a pair of vertically spaced, transversely aligned, longitudinally extending parallel anchor links 53U and 53L each connected at its one end to the respective bolster bracket 49 and at its other end to the respective body structure bracket 51. Preferably, anchor links 53U and 53L are of the type disclosed in James C. Travilla U.S. Pat. No. 3,315,555, although other types of anchor links such as those of Vernon L. Greene Reissue U.S. Pat. No. 21,987 might be used.

With this arrangement of anchor links 53U and 53L, vertical and lateral movements of body structure 45 permitted by compression and lateral shear in springs 43 are freely accommodated by pivoting of anchor links 53U and 53L about their connections to bolster brackets 49 and body structure brackets 51. However, tipping of bolster 35 relative to the body structure about the bolster major axis transverse of the truck is prevented as is any relative longitudinal movement between the bolster and body structure.

Figure 4:
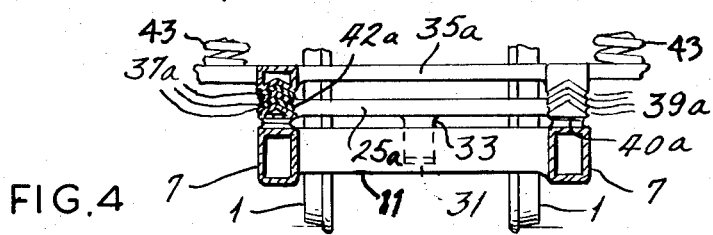
FIG. 4 is a transverse vertical sectional view corresponding to FIG. 3 but showing a modified form of the truck.

In the modification shown in FIG. 4, flat elastomeric pad devices 37, 39 are replaced by similarly longitudinally inclined pad devices 37a, 39a of generally V or chevron shaped cross section transversely of the truck, positoned between opposed upwardly facing inverted V-shaped surfaces 40a on sub-bolster 25a and similar downwardly facing surfaces 42a on bolster 35a. Chevron-shaped pad devices 37a, 39a, like pad devices 37, 39, permit relative tipping of bolster 35 and sub-bolster 25a about a low-level axis transverse of the truck, while preventing swivel movements between the bolster and sub-bolster because of the lateral stiffness of the chevron-shaped pad devices. This eliminates the need for transverse anchor links 38.

Operation of the structure is as follows: When motors 17 are energized, to drive axles 3 and wheels 1 through gear boxes 19, the tractive forces received by the truck at the points of contact between wheels 1 and the supporting track rails are transferred to truck frame 7, 9, 11 by the engagement of journal boxes 5 with the sides of pedestal jaws 13. The frame 7, 9, 11 remains generally parallel to the track because of the resistance offered by the long longitudinal spacing of frame supporting springs 15 to tilting of the frame. Tractive forces are transmitted from frame 7, 9, 11 through swivel bearing recess 31 in transom 11 and swivel boss 33 to sub-bolster 25, which in turn is held against tipping about an axis transverse of the truck, with respect to truck frame 7, 9, 11, by the longitudinal spacing of bearings 27, 29. As the vehicle moves along track having vertical curvature, necessary tipping of the truck frame relative to the body and bolster 35 is accommodated by shear longitudinally of the truck in elastomeric pads 37, the effective center of such tilt being fixed at rail level by the convergence at point P of the pad normals. Since bolster 35 is held against tipping about an axis transverse of the truck with respect to the body by the vertically spaced parallel arrangement of anchor links 53U and 53L, all tipping movements are restricted to those about a transverse axis through point P, thus eliminating any vertical moment arm through which tractive forces applied to the truck at rail level might operate to tip the truck frame about a transverse axis relative to the truck and thereby reduce the leading axle load and increase the trailing axle load. This arrangement permits the interposition of soft springs 43 between bolster 35 and body 45 without changing the location of the effective fulcrum axis P—P, so that desirable soft riding qualities may be provided to the body.

Various changes may be made in the details of the structure described without departing from the spirit of the invention and the exclusive use of such modifications as come within the scope of the appended claims is contemplated.

I claim:

1. A railway vehicle suspension comprising longitudinally spaced wheeled axles, a truck frame supported on said axles, a transverse sub-bolster swivelly supported on said truck frame and restrained against tilting longitudinally thereof, a bolster, means supporting said bolster on said sub-bolster for tilting movements thereon about an axis transverse of the truck at a lower level than said axles, upright springs seated on said bolster at both sides of the truck, vehicle body structure carried on said springs and means holding said bolster against tipping movements about an axis transverse of the body structure and longitudinal movements, both with respect to the body structure, while permitting relative vertical movements therebetween.

2. A railway vehicle suspension according to claim 1 wherein said supporting means comprises a pair of longitudinally oppositely inclined elastomeric pad devices seated on said sub-bolster at each side of the truck with their normals intersecting at a lower level than said axles.

3. A railway vehicle truck according to claim 2 wherein said elastomeric pad devices are of generally V-shaped cross section transversely of the truck.

4. A railway vehicle truck according to claim 2 wherein said pad devices are flat and are horizontally disposed transversely of the truck.

5. A railway vehicle suspension according to claim 4, including means preventing relative swivel movements between said sub-bolster and said bolster while accomodating relative tipping movements of said bolster and said sub-bolster about the axis transverse of the truck defined by the intersections of the normals of said elastomeric pad devices.

6. A railway vehicle suspension according to claim 5 wherein said swivel preventing means comprises a pair of transversely extending anchor links spaced apart longitudinally of the truck and connected at one end to said sub-bolster and at the opposite end to said bolster.

7. A railway vehicle suspension according to claim 2 wherein said truck frame and said sub-bolster are formed with longitudinally spaced apart opposed horizontal bearing means whereby to prevent said sub-bolster from tipping longitudinally of the truck with respect to said truck frame.

8. A railway vehicle suspension according to claim 7 wherein there are a pair of said opposed bearing means at each side of the truck.

9. A railway vehicle suspension according to claim 1 wherein said holding means comprises a pair of vertically spaced parallel longitudinally extending anchor links and at least one additional anchor link transversely spaced from said first-named anchor links, each of said anchor links being connected at one end to said bolster and at the other end to said body structure.

10. A railway vehicle suspension according to claim 1 wherein said holding means comprises a pair of vertically spaced parallel longitudinally extending anchor links at each side of the truck each connected at one end to said bolster and at the other end to said body structure.

11. A railway vehicle suspension according to claim 1 wherein said upright springs are yieldable transversely of the truck to permit lateral movement of said body with respect to said bolster and said holding means is constructed to accommodate such movement.

12. A railway vehicle suspension according to claim 1, including traction motors supported from said truck frame and drivingly connected to the respective wheeled axles.

13. A railway vehicle truck comprising longitudinally spaced wheeled axles, a truck frame supported on said axles, a transverse sub-bolster swively supported on said truck frame and restrained against tilting longitudinally thereof, a bolster, means supporting said bolster on said sub-bolster for tilting movements thereon about an axis transverse of the truck at a lower level than said axles, upright body support springs seated on said bolster at both sides of the truck, and means adapted to hold said bolster against tipping movements about an axis transverse of the truck and longitudinal movements, both with respect to a supported body, while permitting relative vertical movements therebetween.

14. A railway vehicle truck according to claim 13 wherein said holding means comprises a pair of vertically spaced parallel longitudinally extending anchor links at each side of the truck connected at one end to said bolster and at the other end to said body structure.

15. A railway vehicle truck according to claim 13 wherein said supporting means comprises a pair of longitudinally inclined elastomeric pad devices seated on said subbolster at each side of the truck with their normals intersecting at a lower level than said axles.

16. A railway vehicle truck according to claim 15, including means preventing relative swivel movements between said sub-bolster and said bolster while accommodating relative tipping movements of said bolster and said sub-bolster about the axis transverse of the truck defined by the intersections of the normals of said elastomeric pad devices.

17. A railway vehicle truck according to claim 15 wherein said holding means comprises a pair of vertically spaced parallel longitudinally extending anchor links at each side of the truck connected at one end to said bolster and at the other end to said body structure.

* * * * *